United States Patent [19]
Kurano et al.

[11] Patent Number: 6,069,902
[45] Date of Patent: May 30, 2000

[54] BROADCAST RECEIVER, TRANSMISSION CONTROL UNIT AND RECORDING/REPRODUCING APPARATUS

[75] Inventors: Yukio Kurano, Higashiosaka; Masazumi Yamada, Moriguchi; Hidetoshi Takeda, Neyagawa; Akira Iketani, Higashiosaka; Hiroyuki Iitsuka, Katano, all of Japan

[73] Assignee: Matsushita Electric Industrial Co., Ltd., Kadoma, Japan

[21] Appl. No.: 08/661,967

[22] Filed: Jun. 12, 1996

[30] Foreign Application Priority Data

Jun. 14, 1995 [JP] Japan ................................. 7-172798
Aug. 1, 1995 [JP] Japan ................................. 7-196347

[51] Int. Cl.[7] ........................................... H04J 3/04
[52] U.S. Cl. ........................................... 370/535
[58] Field of Search ........................ 370/493, 494, 370/495, 496, 498, 485, 486, 535, 536, 537, 389, 351, 480, 484, 489; 348/6, 7, 12, 13, 16, 460, 385, 387, 10; 386/83

[56] References Cited

U.S. PATENT DOCUMENTS

| | | | |
|---|---|---|---|
| 4,027,333 | 5/1977 | Kaiser et al. | 348/385 |
| 4,847,829 | 7/1989 | Tompkins et al. | 370/260 |
| 4,873,584 | 10/1989 | Hashimoto | 386/83 |
| 5,196,930 | 3/1993 | Kadono et al. | 382/41 |
| 5,508,733 | 4/1996 | Kassatly | 348/385 |
| 5,559,808 | 9/1996 | Kostreski et al. | 370/517 |
| 5,633,683 | 5/1997 | Rosengren et al. | 348/385 |
| 5,727,060 | 3/1998 | Young | 386/83 |

*Primary Examiner*—Dang Ton
*Attorney, Agent, or Firm*—Renner, Otto, Boisselle & Sklar

[57] ABSTRACT

A method for receiving a broadcast includes the steps of receiving a digital signal obtained by multiplexing at least one program; selecting data corresponding to one program among the at least one program multiplexed in the digital signal, decoding the selected data; and selecting data corresponding to at least one program among the at least one program multiplexed in the digital signal, and transmitting the selected data to an external device.

15 Claims, 6 Drawing Sheets

BROADCAST RECEIVER, TRANSMISSION CONTROL UNIT AND RECORDING/REPRODUCING APPARATUS

BACKGROUND OF THE INVENTION

1. Field of the Invention

The present invention relates to a broadcast receiver for receiving a broadcast of digital signals, a transmission control unit for controlling the transmission of the digital signals and a recording/reproducing apparatus for recording and reproducing the transmitted digital signals.

2. Description of the Related Art

Currently, MPEG (Moving Picture Coding Group) is in wide use as an encoding technology for digital TV broadcasting. In the case of an MPEG2 system, it is possible not only to multiplex video data, audio data and text data within a single program but also to multiplex and transmit a plurality of programs.

However, in a conventional receiver, only one demultiplexer which separates multiplexed signals is provided for transmitting signals to the MPEG decoder. Therefore, the conventional receiver is capable only of handling one program to be decoded and reproduced among m number of programs transmitted. That is, it is impossible, for example, to select and record on a VTR an n number of programs among m number of programs (m and n each is an integer satisfying m≧n), or to select n number of programs and supply the corresponding data to a personal computer for processing.

The present invention is intended to solve these problems, and its objective is to realize a broadcast receiver capable of, while decoding one program among m number of programs, recording a plurality of other programs on a VTR or supplying data for other programs to a personal computer.

Furthermore, the development of a fast digital interface for performing an isochronous transmission of digital signals is recently in progress. Particularly, a serial bus of IEEE 1394 standard provides advantages of performing a transmission at a high rate and performing isochronous transmission and asynchronous transmission at the same time. Consequently, this serial bus is expected to serve as an interface suitable for multimedia transmission such as image data transmission. This interface is also expected to be adopted in a transmission control unit for transmitting data from the broadcast receiver mentioned above to a recording apparatus.

When the recording apparatus connected to the broadcast receiver records digital signals, in order to match the output timing of each data packet in the reproduction with the arrival timing of each data packet in the recording, it is necessary to generate a recording timing for each data packet and to record the recording timing together with the corresponding data packet as recording time-stamp.

In a conventional configuration, in order to generate a recording time stamp, it is necessary to analyze the internal structure of the digital signal and extract information for recovering the operation frequency from the digital signal, thereby increasing the amount of hardware on the recording apparatus side.

The present invention is intended to solve this problem, and afford for providing a transmission control unit and a recording/reproducing apparatus which does not require analyzing the internal structure of digital signals.

SUMMARY OF THE INVENTION

According to one aspect of the present invention, a method for receiving a broadcast includes the steps of receiving a digital signal obtained by multiplexing at least one program; selecting data corresponding to one program among the at least one program multiplexed in the digital signal, decoding the selected data; and selecting data corresponding to at least one program among the at least one program multiplexed in the digital signal, and transmitting the selected data to an external device.

According to another aspect of the present invention, an apparatus for receiving a broadcast includes a receiver for receiving a digital signal obtained by multiplexing at least one program; a first selector for selecting data corresponding to one program among the at least one program multiplexed in the digital signal; a second selector for selecting data corresponding to at least one program among the at least one program multiplexed in the digital signal; a decoder for decoding the data selected by the first selector; and a transmitter for transmitting the data selected by the second selector to an external device.

In one embodiment of the present invention, the apparatus further includes a controller for comparing the recording rate of the data selected by the second selector with the transmission rate of the data transmitted by the transmitter.

According to still another aspect of the present invention, a transmission control unit connected to a receiver includes a detector for detecting a time for receiving a data packet output from the receiver and for outputting a detection signal indicating the time; a second time-stamp generator for generating a second time-stamp based on a predetermined frequency used in decoding the data packet in the receiver, in response to the detection signal; a time-stamp provider for adding the second time-stamp to the data packet so as to generate a source packet; and a packet transformer for transforming the source packet into a transmission packet and for outputting the transmission packet to a transmission path.

In one embodiment of the present invention, the predetermined frequency is substantially equal to a frequency used in recording the data packet in a recording medium.

In one embodiment of the present invention, the transmission control further includes a first time-stamp generator for generating a first time-stamp based on a predetermined frequency used in transmitting the transmission packet in the transmission control unit, in response to the detection signal. The time-stamp provider adds the first time-stamp and the second time-stamp to the data packet so as to generate the source packet.

In one embodiment of the present invention, the predetermined frequency is substantially equal to a frequency of the cycle time used to synchronize respective component devices connected to the transmission path.

According to still another aspect of the present invention, a recording/reproducing apparatus connected to a receiver through a transmission control unit includes a second time-stamp separator for receiving a data packet to which a second time-stamp has been added from the receiver, and for separating the second time-stamp from the data packet to which a second time-stamp has been added so as to obtain a data packet; and a recording device for recording the data packet and a recording time-stamp relating to the second time-stamp in a recording medium. The second time-stamp is generated based on a predetermined frequency used in decoding the data packet in the receiver and the recording time-stamp defining a timing for recording the data packet in the recording medium.

In one embodiment of the present invention, the recording/reproducing apparatus further includes a first time-stamp separator for receiving a source packet from the receiver, and for separating a first time-stamp from the source packet. The first time-stamp is generated based on a predetermined frequency used in transmitting the transmission packet in the transmission control unit.

In one embodiment of the present invention, a portion of the recording time-stamp is generated based on the first time-stamp.

In one embodiment of the present invention, the recording time-stamp is generated based on a predetermined frequency used in recording the data packet and the second time-stamp in the recording medium.

In one embodiment of the present invention, the recording/reproducing apparatus further includes a reproducing device for reproducing data recorded in the recording medium so as to obtain the data packet and the recording time-stamp; and a third time-stamp separator for separating the second time-stamp from the recording time-stamp.

In one embodiment of the present invention, the transmission control unit includes a time-stamp provider for receiving the data packet and the second time-stamp from the recording/reproducing apparatus, and for adding the second time-stamp to the data packet.

In one embodiment of the present invention, the transmission control unit includes a first time-stamp generator for generating a first time-stamp based on a predetermined frequency used in transmitting a transmission packet in the transmission control unit. The time-stamp provider adds the first time-stamp and the second time-stamp to the data packet.

In one embodiment of the present invention, the second time-stamp is generated by deleting a portion of the recording time-stamp.

The broadcast receiver as described above selects n number of programs among m number of programs (n and m each being an integer satisfying m≧n) and transmits the selected n number of programs to an external apparatus through a digital interface. This makes it possible to select n number of programs from m number of programs and then supply the data to the external apparatus for processing. Moreover, the broadcast receiver has two kinds of program selectors, one for the decoder and the other for the transmitter. Therefore, for example, while watching a program decoded by the decoder, the data from the transmitter can be processed for a back-up.

Thus, the invention described herein makes possible the advantage of providing a transmission control unit and a recording/reproduction apparatus which does not require analyzing the internal structure of digital signals.

These and other advantages of the present invention will become apparent to those skilled in the art upon reading and understanding the following detailed description with reference to the accompanying figures.

DESCRIPTION OF THE PREFERRED EMBODIMENTS

Figure 1:
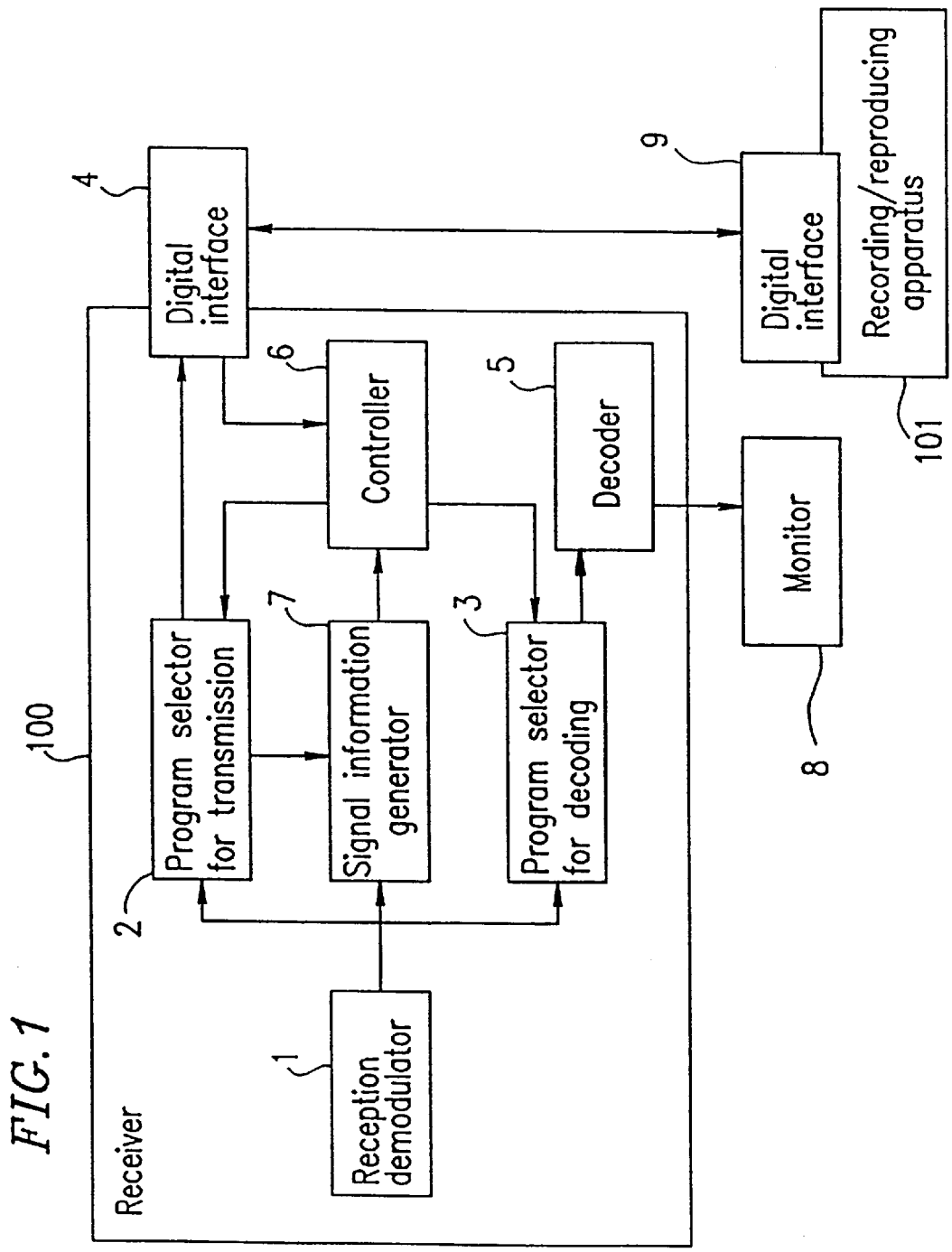
FIG. 1 is a block diagram illustrating a basic configuration of a broadcast receiver 100 according to one example of the present invention.

Hereinafter, parts having the same constructions and functions are referred to by the same reference numerals.

A broadcast reception method and a broadcast receiver according to one example of the present invention will be described with reference to FIG. 1.

FIG. 1 is a block diagram illustrating a basic configuration of the broadcast receiver 100 according to the present invention. The broadcast receiver 100 includes a reception demodulator 1, a program selector for transmission 2, a program selector for decoding 3, a digital interface 4, a decoder 5, controller 6 and signal information generator 7.

The reception demodulator 1 receives broadcast data from a broadcast medium and provides the broadcast data with the program selector for transmission 2, the program selector for decoding 3 and the signal information generator 7. The program selector for decoding 3 selects a program among m number of programs contained in the broadcast data and sends data of the selected program to the decoder 5. The decoder 5 decodes the program selected by the program selector for decoding 3.

The program selector for transmission 2 selects n number of programs among m number of programs. Herein, m and n denote integers. The signal information generator 7 generates auxiliary information for the data of n programs (hereinafter, referred to as n streams) obtained by the program selector for transmission 2 based on the auxiliary information for the data of m programs (referred to as m streams). The auxiliary information to be generated includes a recording rate of the n streams, a table (PAT) describing program identification (PID) contained in the n streams, and a program clock reference (PCR).

The PCR is an item of information contained in the bit stream of an MPEG, which is for setting and correcting the value of an STC (system clock; basic synchronization signal) to a desired value so that the STC can be used as the time standard on the encoder side of an MPEG system decoder including videos and audios.

The auxiliary information for the n streams obtained by the signal information generator 7 is supplied to the controller 6. The controller 6 adds the auxiliary information for the n streams to the n streams. The controller 6 compares the recording rate of the n streams with the transmission rate of the n streams in which data is transmitted to a recording/reproducing apparatus 101 through the digital interfaces 4 and 9, and controls the value of n such that the transmission rate of the n streams becomes equal to or less than a constant value. The n streams obtained in the program selector for transmission 2 are sent to the digital interface 4.

According to the broadcast receiver as described above, it becomes possible to select n number of programs among m number of programs and transmit the selected n number of programs to an external apparatus such as a digital VTR and a personal computer through the digital interface 4. As a result, it becomes possible to select n number of programs among m number of programs and input the data of the n number of programs to a personal computer for data processing. Moreover, since the broadcast receiver includes two kinds of program selectors, one for the decoder and the other for the transmitter, it becomes possible, for example, to record the data from the transmitter on a digital VTR for a back-up while watching a program decoded by the decoder.

As described above, according to the present invention, it is possible to select n number of programs among m number of programs and transmit the data of the n number of programs to an external apparatus through the digital interface. As a result, it is possible to select n number of programs among m number of programs and input the data of the n number of programs to a personal computer for data processing. Moreover, since the broadcast receiver includes two kinds of program selectors, one for the decoder and the other for the transmitter, it is possible, for example, to record the output data from the transmitter for a back-up while watching a program decoded by the decoder.

Next, the configuration of the digital interface 4 will be described. It is assumed here that MPEG2 signals are transmitted by an IEEE 1394 transmitter.

Figure 2:
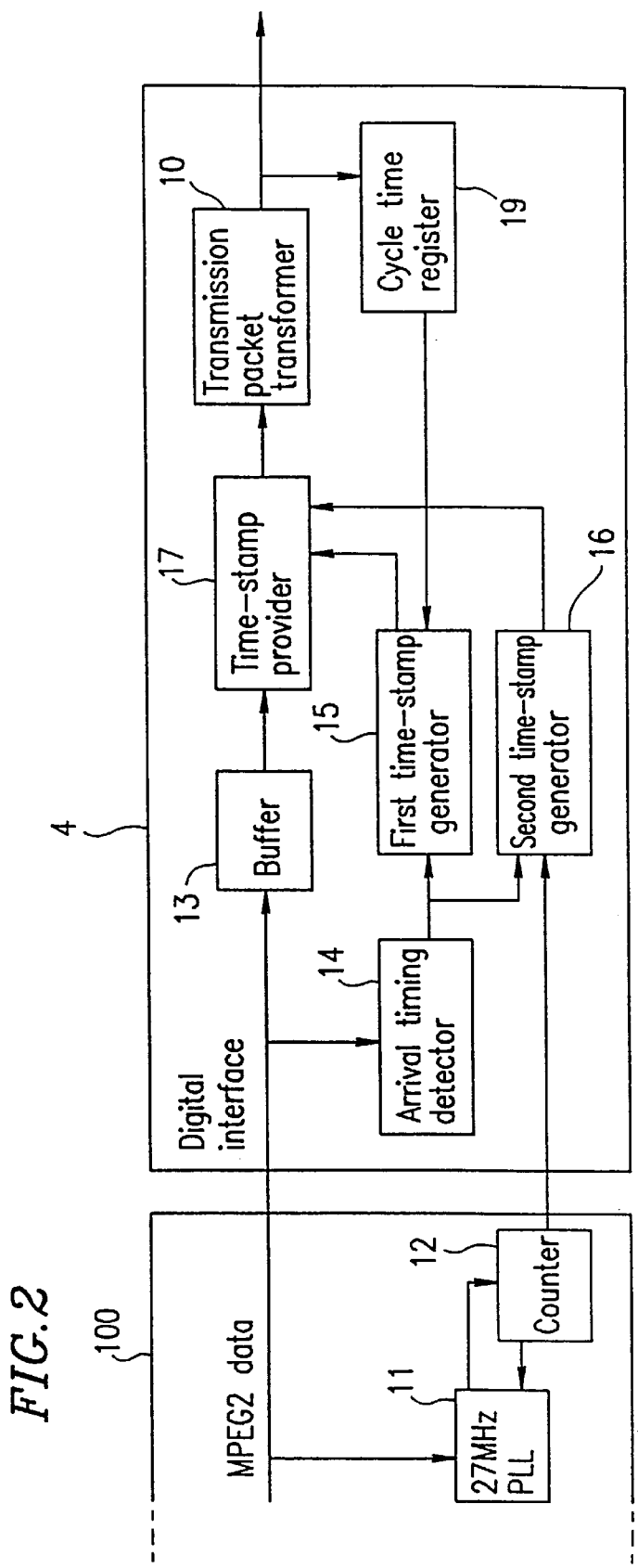
FIG. 2 is a block diagram illustrating a configuration of a digital transmission control unit on the transmitter side according to an example of the present invention.

As shown in FIG. 2, the digital interface 4 includes a buffer 13, an arrival timing detector 14, a first time-stamp generator 15, a second time-stamp generator 16, a time-stamp provider 17, a cycle time register (CTR) 19 and a transmission packet transformer 10.

The first time-stamp is generated based on the count value of the cycle time register (CTR) 19. The cycle time register (CTR) 19 serves the function of a clock for synchronizing respective components connected to a transmission path.

The arrival timing at which each MPEG2 data packet is output from the receiver 100 to the digital interface 4 is detected by the arrival timing detector 14. The first time-stamp generator 15 generates a first time-stamp (i.e., a transmission time-stamp) by latching the value of the CTR 19 at the arriving time of the data packet and by adding, to the latched value, the count value corresponding to a pre-determined maximum delay time between the receiver 100 and the recording/reproducing apparatus 101.

The second time-stamp generator 16 generates a second time-stamp (i.e., a recording time-stamp) by latching the value of a counter 12 of a 27 MHz PLL 11 at the arrival time of the data packet. The counter 12 and the 27 MHz PLL 11 are included in the decoder 5 of the receiver 100.

An input data packet is stored in the buffer 13. Then, the transmission time-stamp and the recording time-stamp are added to the data packet by the time-stamp provider 17. As a result, the data packet is transformed into a source packet. The source packet is further transformed into a transmission packet by the transmission packet transformer 10.

Figure 6:
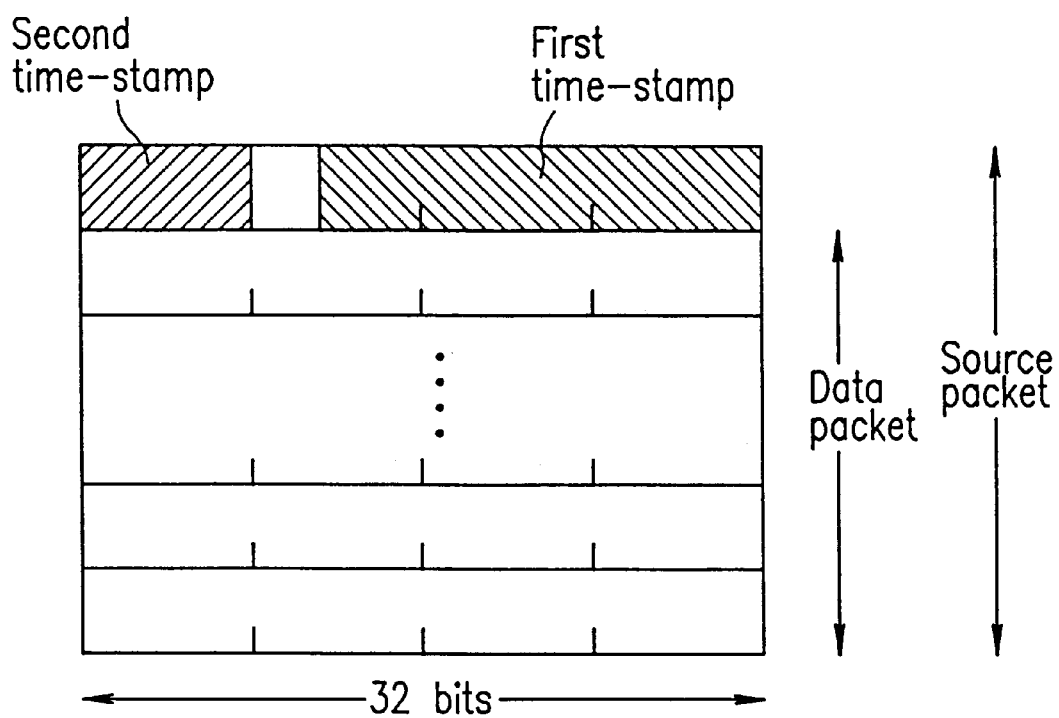
FIG. 6 is a diagram illustrating the structure of a source packet according to the present invention.

FIG. 6 illustrates the structure of the source packet. It is assumed that a transmission by the IEEE 1394 transmitter is performed in units of four bytes and a source packet header is four bytes in size. It is also assumed that the transmission time-stamp has the same format as the lower 20 bits of bits indicating a value of the CTR, and the recording time-stamp consists of 12 bits indicating a count value at 27 MHz.

It is assumed that, for example, the recording time-stamp is based on a system clock of MPEG2 having a frequency of 27 MHz which is the operation frequency of the signal processing circuit of the deck, and that the transmission time-stamp is based on a clock having a frequency of 24.576 MHz which is the frequency of the CTR of the IEEE 1394 transmitter.

The use of the frequency of 27 MHz to generate the recording time-stamp is advantageous because a clock having the frequency of 27 MHz is easily generated since the broadcast receiver always has a 27 MHz clock and that it is possible to maintain high accuracy of timing when finally returning to the decoder. The use of the frequency of 24.576 MHz to generate the transmission time-stamp is advantageous because the lower bits of the CTR can be used without making any changes.

Figure 3:
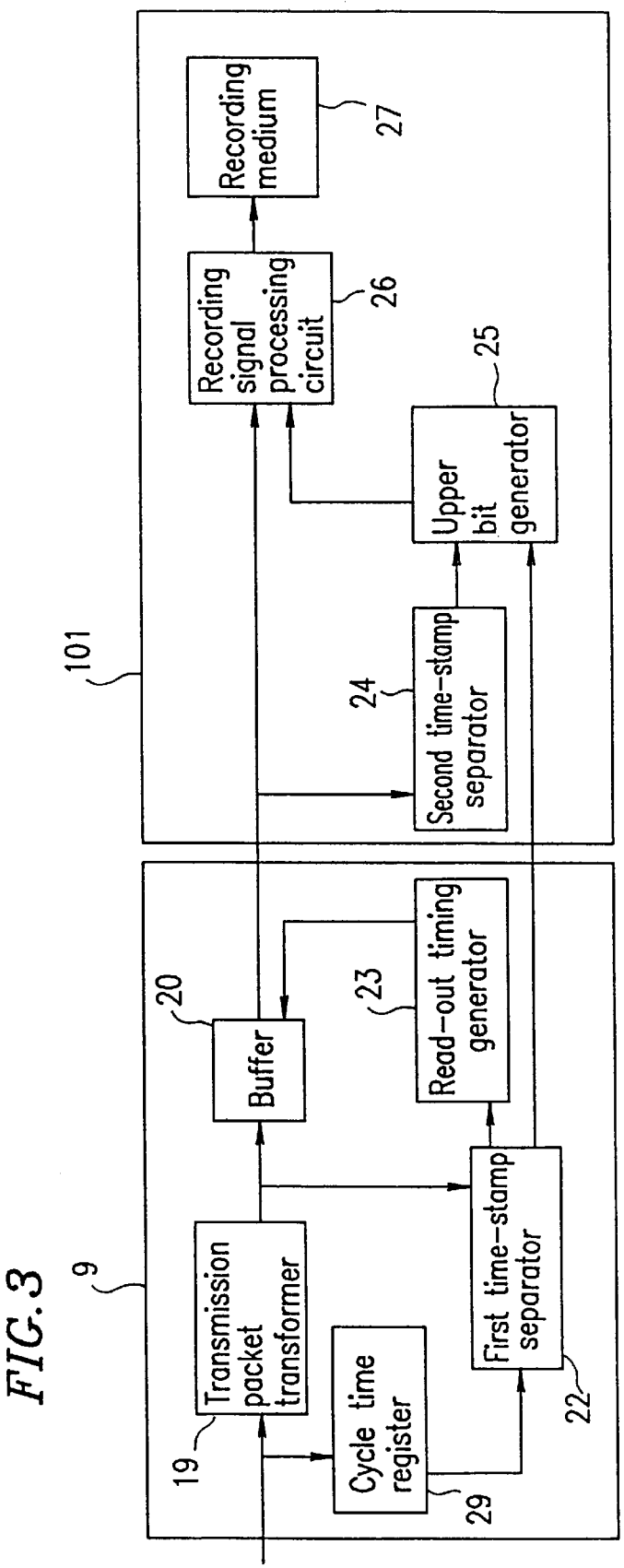
FIG. 3 is a block diagram illustrating a configuration of a digital transmission control unit and a recording/reproducing apparatus on a recording side according to an example of the present invention.

FIG. 3 illustrates the configuration of the digital interface 9 and the recording/reproducing apparatus 101. As shown in FIG. 3, the digital interface 9 includes a transmission packet transformer 19, a buffer 20, a first time-stamp separator 22, a read-out timing generator 23 and a cycle time register (CTR) 29. The recording/reproducing apparatus 101 includes a second time-stamp separator 24, an upper bit generator 25 and a recording signal processing circuit 26. The data is recorded in a recording medium 27.

A transmission packet arriving at the receiver side is transformed into a source packet by the transmission packet transformer 19.

The first time-stamp separator 22 separates the transmission time-stamp from the source packet. The read-out timing generator 23 sends out a read-out signal to the buffer 20 in such a time that the value of the first time-stamp (i.e., the transmission time-stamp) matches the count value of the CTR 29. As a result, the data packet is output from the buffer 20 in such a time that the time delay between the input time into the transmitter side and the output time from the receiver side remains constant.

The second time-stamp separator 24 separates the second time-stamp from the data packet to which the second time-stamp has been added.

The separated second time-stamp is input to the recording signal processing circuit 26 as well as the data packet. Then, the data packet and the second time-stamp are performed by processes such as formatting suitable for the recording medium, correction encoding, demodulation, etc. After completing such processes, the data packet and the second time-stamp are recorded on the recording medium 27.

When the size of the second time-stamp in the source packet and the size of the recording time-stamp recorded on the recording medium are the same, the second time-stamp is recorded on the recording medium without making any change to the recording time-stamp. This is an option (a first method) for recording the recording time-stamp on the recording medium.

When the size of the second time-stamp in the source packet is smaller than the size of the recording time-stamp recorded on the recording medium, the upper bits of the recording time-stamp may be generated based on the first time-stamp (i.e., the transmission time-stamp). This is an alternative option (a second method) for recording the recording time-stamp on the recording medium.

For example, when data having 21 bits indicating a count value at 27 MHz is used as the recording-stamp recorded on the recording medium and only the lower 8 bits at 27 MHz are added to the source packet as the second time-stamp, it is necessary to represent the upper 13 bits as multiples of $1/27000000 \times 256 = 9.48247 \times 10^{-6}$ sec.

On the other hand, the transmission time-stamp has a value counting up every $1/24576000 = 4.06901 \times 10^{-8}$ sec and its transmission interval is equal to or less than 100 msec. Therefore, it is possible to generate the upper 13 bits of the recording time-stamp based on the count value of the transmission time-stamp. The ninth bit at 27 MHz is counted up by one every 233.017 counts at 24.576 MHz. Consequently, the ninth bit is configured to be counted up by one every 233 counts in a typical way, and to be counted up by one at 234 counts which occurs once per about 60 cycles because a fraction count 0.017 is accumulated.

Next, the digital interface 9 and the recording/reproducing apparatus 101 having another configuration will be described.

Figure 4:
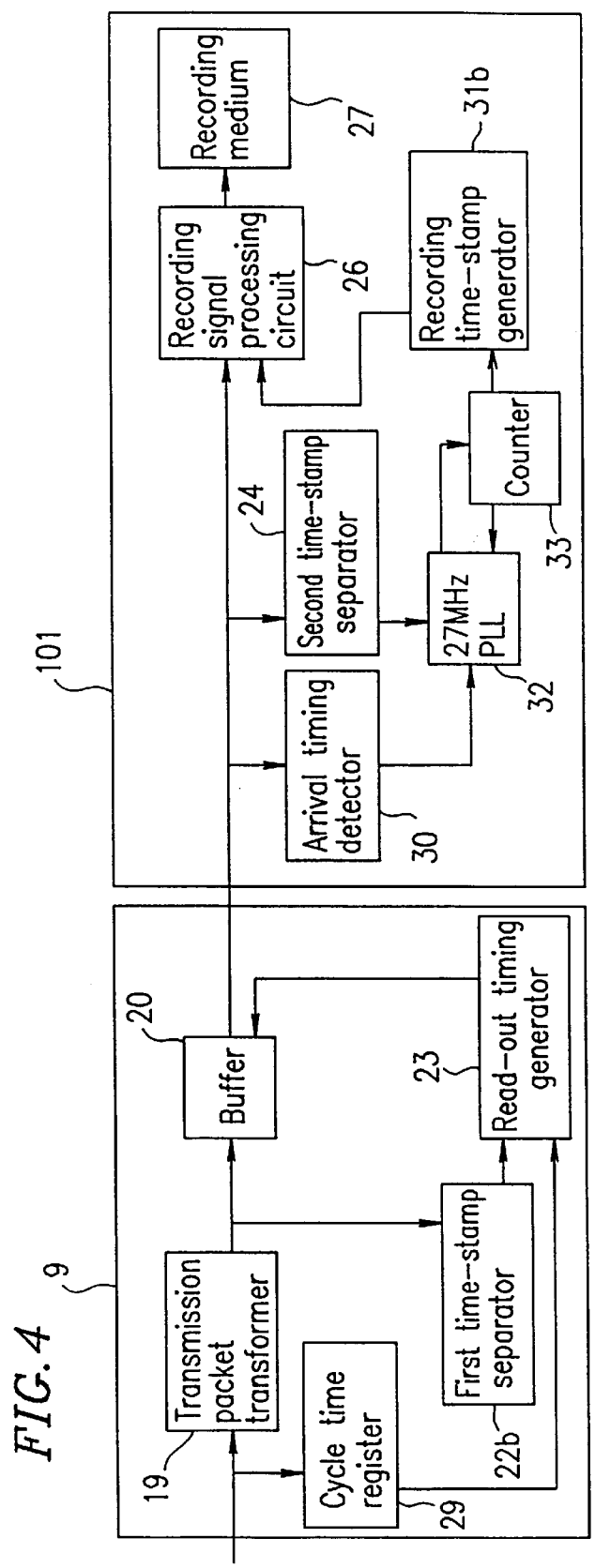
FIG. 4 is a block diagram illustrating a configuration of a recording apparatus according to another example of the present invention.

As shown in FIG. 4, the digital interface 9 includes a transmission packet transformer 19, a buffer 20, a first time-stamp separator 22b, a read-out timing generator 23 and a cycle time register (CTR) 29. The recording/reproducing apparatus 101 includes an arrival timing detector 30, a second time-stamp separator 24, a recording time-stamp generator 31b, a 27 MHz PLL 32, a 27 MHz counter 33 and a recording signal processing circuit 26. The data is recorded on a recording medium 27.

The second time-stamp separator 24 separates the second time-stamp from the data packet to which the second time-stamp has been added. The 27 MHz PLL 32 includes a 27 MHz oscillator for generating a clock having a frequency of 27 MHz and a counter 33 for operating in synchronization with the clock. By comparing the value of the second time-stamp with the count value of the counter 33 and by correcting the clock in accordance with the comparison result, the 27 MHz clock which is used in encoding the input MPEG2 signals can be recovered without extracting PCR from the inside of the signals. In addition, an accurate operation frequency can be obtained with transmission jitters being absorbed.

The arrival timing detector 30 detects the arrival timing of each data packet at the recording/reproducing apparatus 101.

The recording time-stamp generator 31b latches the count value of the 27 MHz counter 33 in response to the arrival timing of the data packet detected by the arrival timing detector 30 so as to generate the recording time-stamp. The data packet and the recording time-stamp corresponding to the data packet are input to the recording signal processing circuit 26, respectively. Then, the data packet and the second time-stamp are performed by processes such as formatting suitable for the recording medium, correction encoding, demodulation, etc. After completing such processes, the data packet and the second time-stamp are recorded on the recording medium 27.

Figure 5:
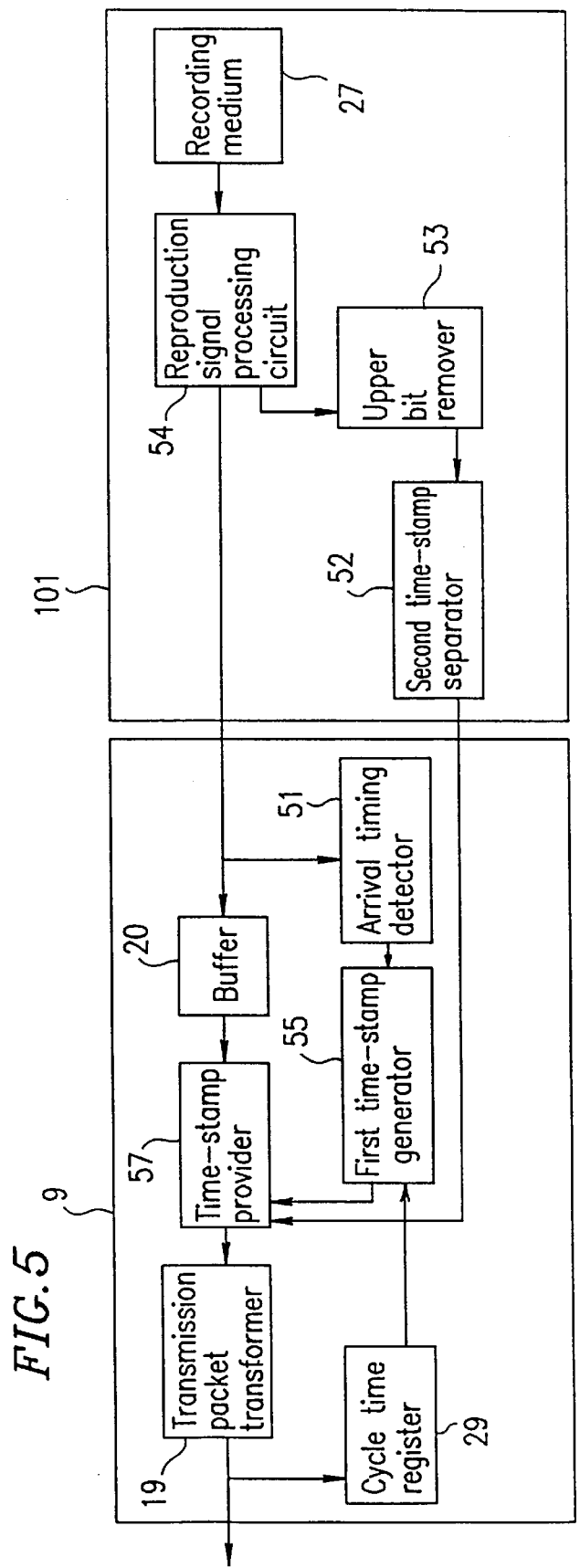
FIG. 5 is a block diagram explaining operations of a digital transmission control unit and a recording/reproducing apparatus according to an example of the present invention.

FIG. 5 illustrates the configuration of the digital interface 9 and the recording/reproducing apparatus 101, in relation to the reproduction operation.

As shown in FIG. 5, the digital interface 9 includes a buffer 20, an arrival timing detector 51, a first time-stamp generator 55, a time-stamp provider 57, a cycle time register 29, and a transmission packet transformer 19. The recording/reproducing apparatus 101 includes a second time-stamp separator 52, an upper bit remover 53, and a reproduction signal processing circuit 54. The data is recorded on a recording medium 27.

The arrival timing at which each MPEG2 data packet is output from the recording/reproducing apparatus 101 to the digital interface 9 is detected by the arrival timing detector 51. The first time-stamp generator 55 generates the transmission time-stamp by latching the value of the CTR 29 at the arrival timing of the data packet and by adding, to the latched value, a count value corresponding to a predetermined maximum time delay between the digital interfaces.

Moreover, the second time-stamp separator 52 separates the recording time-stamp existing in the data reproduced from the recording medium 27 and performed on by processes such as demodulation and correction by the reproduction signal processing circuit 54 with the data packet.

When the recording medium 27 is the same recording medium on which the data are recorded in the first method mentioned above, i.e., when the recording time-stamp is of the same number of bits as the data being transmitted, the separated recording time-stamp is sent to the time-stamp provider 57 as the second time-stamp with the transmission time-stamp.

The reproduced data packet is stored in the buffer 20. Then, the transmission time-stamp and the recording time-stamp are added to the reproduced data packet by the time-stamp provider 57. As a result, the reproduced data packet is transformed into a source packet. The source packet is further transformed into a transmission packet by the transmission packet transformer 19. The transmission packet is transmitted from the digital interface 9 to the digital interface 4.

In the above described examples, the sizes of the data packet, the source packet, the transmission packet and the bit arrangement are all arbitrary. Furthermore, the number of bits of the first time-stamp and the second time-stamp is arbitrary.

Moreover, the arrangement on the recording medium of the data packet and the recording time-stamp, and the number of bits thereof are also arbitrary.

As described above, according to the present invention, a transmitter and a recording/reproducing apparatus which do not require an internal analysis of the digital signal can be obtained, thereby reducing the hardware and the cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for receiving a broadcast, the method comprising the steps of:

receiving a digital signal obtained by multiplexing m programs;

selecting data corresponding to one program among the m programs multiplexed in the digital signal, and decoding the selected data; and selecting data corresponding to n programs among the m programs multiplexed in the digital signal, and transmitting the selected data to an external device, wherein m and n are integers and m>n;

detecting a time for receiving a data packet of the selected data with the external device and outputting a detection signal indicating the time;

generating a second time-stamp based on a predetermined frequency used in decoding the selected data in the data packet, in response to the detection signal;

adding the second time-stamp to the data packet so as to generate a source packet; and transforming the source packet into a transmission packet and outputting the transmission packet to a transmission path.

2. An apparatus for receiving a broadcast, the apparatus comprising:

a receiver for receiving a digital signal obtained by multiplexing m programs;

a first selector for selecting data corresponding to one program among the m programs, multiplexed in the digital signal;

a second selector for selecting data corresponding to n programs among the m programs multiplexed in the digital signal, wherein m and n are integers are m>n;

a decoder for decoding the data selected by the first selector; and a transmitter for transmitting the data selected by the second selector to an external device;

wherein the external device is a transmission control unit connected to a receiver, the transmission control unit comprising:

a detector for detecting a time for receiving a data packet output from the transmitter and for outputting a detection signal indicating the time;

a second time-stamp generator for generating a second time-stamp based on a predetermined frequency used in decoding the data packet in the decoder, in response to the detection signal;

a time-stamp provider for adding the second time-stamp to the data packet so as to generate a source packet; and a packet transformer for transforming the source packet into a transmission packet and for outputting the transmission packet to a transmission path.

3. An apparatus according to claim 2, further comprising a controller for comparing the recording rate of the data selected by the second selector with the transmission rate of the data transmitted by the transmitter.

4. A transmission control unit connected to a receiver, the transmission control unit comprising:

a detector for detecting a time for receiving a data packet output from the receiver and for outputting a detection signal indicating the time;

a second time-stamp generator for generating a second time-stamp based on a predetermined frequency used in decoding the data packet in the receiver, in response to the detection signal;

a time-stamp provider for adding the second time-stamp to the data packet so as to generate a source packet; and a packet transformer for transforming the source packet into a transmission packet and for outputting the transmission packet to a transmission path.

5. A transmission control unit according to claim 4, wherein the predetermined frequency is substantially equal to a frequency used in recording the data packet in a recording medium.

6. A transmission control unit according to claim 4, further comprising a first time-stamp generator for generating a first time-stamp based on a predetermined frequency used in transmitting the transmission packet in the transmission control unit, in response to the detection signal, wherein the time-stamp provider adds the first time-stamp and the second time-stamp to the data packet so as to generate the source packet.

7. A transmission control unit according to claim 6, wherein the predetermined frequency is substantially equal to a frequency of a cycle time used to synchronize respective component devices connected to the transmission path.

8. A recording/reproducing apparatus connected to a receiver through a transmission control unit, the recording/reproducing apparatus comprising:

a second time-stamp separator for receiving a data packet to which a second time-stamp has been added from the receiver, and for separating the second time-stamp from the data packet to which the second time-stamp has been added so as to obtain the data packet; and recording means for recording the data packet and a recording time-stamp relating to the second time-stamp in a recording medium;

and wherein the second time-stamp is generated based on a predetermined frequency used in decoding the data packet in the receiver and the recording time-stamp defining a timing for recording the data packet in the recording medium.

9. A recording/reproducing apparatus according to claim 8, further comprising a first time-stamp separator for receiving a source packet from the receiver, and for separating a first time-stamp from the source packet, wherein the first time-stamp is generated based on a predetermined frequency used in transmitting a transmission packet in the transmission control unit.

10. A recording/reproducing apparatus according to claim 9, wherein a portion of the recording time-stamp is generated based on the first time-stamp.

11. A recording/reproducing apparatus according to claim 8, wherein the recording time-stamp is generated based on a predetermined frequency used in recording the data packet and the second time-stamp in the recording medium.

12. A recording/reproducing apparatus according to claim 8, further comprising:

reproducing means for reproducing data recorded in the recording medium so as to obtain the data packet and the recording time-stamp; and a third time-stamp separator for separating the second time-stamp from the recording time-stamp.

13. A recording/reproducing apparatus according to claim 12, wherein the transmission control unit includes a time stamp provider for receiving the data packet and the second time-stamp from the recording/reproducing apparatus, and for adding the second time-stamp to the data packet.

14. A recording/reproducing apparatus according to claim 13, wherein the transmission control unit includes a first time-stamp generator for generating a first time-stamp based on a predetermined frequency used in transmitting a transmission packet in the transmission control unit, and the time-stamp provider adds the first time-stamp and the second time-stamp to the data packet.

15. A recording/reproducing apparatus according to claim 12, wherein the second time-stamp is generated by deleting a portion of the recording time-stamp.

* * * * *